(12) United States Patent
Shindo

(10) Patent No.: US 8,422,894 B2
(45) Date of Patent: Apr. 16, 2013

(54) IMAGE PROCESSING APPARATUS, IMAGE PROCESSING METHOD AND PROGRAM FOR CONTROLLING CALIBRATION

(75) Inventor: Yukihiro Shindo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 12/739,045

(22) PCT Filed: Mar. 24, 2010

(86) PCT No.: PCT/JP2010/002048
§ 371 (c)(1),
(2), (4) Date: Apr. 21, 2010

(87) PCT Pub. No.: WO2010/116631
PCT Pub. Date: Oct. 14, 2010

(65) Prior Publication Data
US 2011/0194862 A1 Aug. 11, 2011

(30) Foreign Application Priority Data
Apr. 10, 2009 (JP) ................................. 2009-095987

(51) Int. Cl.
*G03G 15/08* (2006.01)
(52) U.S. Cl.
USPC .......................................................... 399/27
(58) Field of Classification Search .................. 399/27, 399/28, 29, 30, 58, 60, 72, 74
See application file for complete search history.

(56) References Cited

U.S. PATENT DOCUMENTS

| 4,318,610 A | * | 3/1982 | Grace | 399/49 |
| 4,348,099 A | * | 9/1982 | Fantozzi | 399/48 |
| 5,081,491 A | * | 1/1992 | Lux et al. | 399/60 |
| 5,321,468 A | * | 6/1994 | Nakane et al. | 399/42 |
| 5,978,506 A | | 11/1999 | Murayama et al. | |
| 2003/0228157 A1 | * | 12/2003 | Byun et al. | 399/12 |
| 2007/0166057 A1 | | 7/2007 | Moriya et al. | |

FOREIGN PATENT DOCUMENTS

| JP | 7-264412 A | 10/1995 |
| JP | 8-95368 A | 4/1996 |
| JP | 8-114985 A | 5/1996 |
| JP | 9-186899 A | 7/1997 |
| JP | 2001-290356 A | 10/2001 |

(Continued)

OTHER PUBLICATIONS

Notification Concerning Submission or Transmittal of Priority Document in International Application No. PCT/JP2010/002048, mail date Jun. 4, 2010.
Notification dated Oct. 20, 2011, forwarding an International Preliminary Report on Patentability dated Oct. 11, 2011, in International Application No. PCT/JP2010/002048.

(Continued)

*Primary Examiner* — Walter L Lindsay, Jr.
*Assistant Examiner* — Billy J Lactaoen
(74) *Attorney, Agent, or Firm* — Fitzpatrick, Cella, Harper & Scinto

(57) ABSTRACT

The problem of the present invention is to appropriately control execution of calibration corresponding to an occurrence situation of a partial toner-low state. In order to solve the above problem, an image processing apparatus according to the present invention includes output unit for outputting an image for detecting a partial toner-low state to a print region, determining unit for determining the partial toner-low state based upon a read result of the image outputted by the output unit, and control unit for controlling execution of calibration adjusting a reproduction characteristic in outputting the image using the toner, based upon a result of the determination by the determining unit.

4 Claims, 13 Drawing Sheets

FOREIGN PATENT DOCUMENTS

| | | |
|---|---|---|
| JP | 2001-350302 A | 12/2001 |
| JP | 2004-4967 A | 1/2004 |
| JP | 2004-038048 A | 2/2004 |
| JP | 2006-309261 A | 11/2006 |
| JP | 2007-187930 A | 7/2007 |

OTHER PUBLICATIONS

Office Action dated May 22, 2012, in Japanese Application No. 2009-95987.

* cited by examiner

SINCE THE REPLACEMENT TIME IS COMING CLOSER,
"AUTOMATIC GRADATION CORRECTION" IS INTERRUPTED.
PLEASE REPLACE Bk TONER.

FIG.11

US 8,422,894 B2

IMAGE PROCESSING APPARATUS, IMAGE PROCESSING METHOD AND PROGRAM FOR CONTROLLING CALIBRATION

TECHNICAL FIELD

The present invention relates to an image processing apparatus, an image processing method and a program.

BACKGROUND ART

As an image forming apparatus for color printing, there is known, for example, a full-color copying machine. In regard to a plurality of output color components composed of cyan (C), magenta (M), yellow (Y) and black (Bk), the full-color copying machine sequentially forms images of the respective color components on a print surface for printing. An image forming system of the full-color copying machine is an electronic photography system by laser beams, for example. In the electronic photography system, a half tone expression is realized by controlling emission of laser beams with a signal a pulse width of which is modulated in response to an image signal. Incidentally in the image forming apparatus like the full-color copying machine, density or gradation characteristics of an image to be formed possibly changes due to a change of an environment where the image forming apparatus is provided or a change with time of apparatus elements such as a photoreceptor or developer. This possibly causes deterioration or instability of an image quality. A so-called calibration is performed for preventing this. The calibration is to form a predetermined patch pattern, for example, on a photosensitive drum or print medium for correcting density or gradation in the printing of image data of the apparatus based upon the density read from the patch pattern. The print medium where the patch pattern (patch-shaped pattern) is thus formed is also called "test print".

According to the conventional calibration, however, in the image forming apparatus, it is not assumed to use a cartridge type toner supplying mechanism which does not have a stirring mechanism as a toner supplying mechanism. Therefore, problematic calibration is possibly carried out.

According to the cartridge type toner supplying mechanism which does not have the stirring mechanism, upon continuously performing a print primarily using the toner at the same position, the toner is biased and the toner can not be supplied for print region, causing a partial toner-low state. A single toner remaining amount detecting sensor is generally mounted on a cartridge due to restrictions by cost, but it can not cover detections of state of toner state at all the positions of the print region. As a result, in a case where the partial toner-low state occurs at a distance from the sensor, even the toner-low can not be determined.

In addition, upon forming a patch pattern for calibration at a position where the partial toner-low state thus occurs, formation of the patch pattern can not be performed with stable density. Performing corrections by gamma correction data obtained by calibration using data of the patch pattern which is formed with such partially unstable density for both of image data formed at the position where the partial toner-low state occurs and image data formed at the position where the partial toner-low state does not occur causes image deterioration. That is to say, when the calibration is performed in this state, the gradation is not appropriately outputted even at a print position where the toner sufficiently exists, so that the image quality is worse than before calibration.

As a system for preventing occurrence of an image defective due to toner bias, there is a system in which a plurality of pairs of electrodes are arranged for detecting a remaining amount of developers accommodated in a developer vessel and the toner is stirred when the detected toner amount differs (Japanese Patent Laid-Open No. 2001-290356).
[Citation List]
[Patent Literature]
[PTL1] Japanese Patent Laid-Open No. 2001-290356

SUMMARY OF INVENTION

[Technical Problem]
However, in the conventional technology, the calibration problem which possibly occurs in the partial toner-low state in the cartridge type toner supplying mechanism can not be solved. This is because the toner bias can not be prevented in the cartridge type toner supplying mechanism which does not have the toner stirring mechanism as described above.

Therefore, an object of the present invention is to determine a partial toner-low state at the time of performing calibration and appropriately process it.
[Solution to Problem]
In order to solve the above problem, an image processing apparatus according to the present invention comprises output unit for outputting an image for detecting a partial toner-low state to a print region, determining unit for determining the partial toner-low state based upon a read result of the image outputted by the output unit, and control unit for controlling execution of calibration adjusting a reproduction characteristic in outputting an image using the toner, based upon a result of the determination by the determining unit.
[Advantageous Effects of Invention]
According to the present invention, the execution of the calibration can be appropriately controlled in accordance with an occurrence situation of the partial toner-low state.

BRIEF DESCRIPTION OF DRAWINGS

FIG. 1 is a diagram showing an outside appearance of an image processing apparatus.
FIG. 2 is a block diagram showing a flow of an image signal in an image processing unit 1008.
FIG. 3 is a block diagram showing a printer unit 110.
FIG. 4 is a block diagram showing an image processing unit 1008 for obtaining a gradation image.
FIG. 5 is a flow chart showing an example of calibration control for a toner-low state.
FIG. 6 is a diagram showing a display example of a display unit 218.
FIG. 7 is a diagram showing a display example of a display unit 218.
FIG. 8 is a diagram showing an example of a test pattern.
FIG. 9 is a diagram showing a display example of a display unit 218.
FIG. 10 is a diagram showing a display example of a display unit 218.

[FIG. 11]

FIG. 11 is a diagram showing a display example of a display unit 218.

FIG. 12 is a flow chart of the processing for detecting a partial toner-low state.

FIG. 13 is a flow chart of the processing for detecting a partial toner-low state.

DESCRIPTION OF EMBODIMENTS

Hereinafter, the best mode of carrying out the present invention will be explained with reference to the drawings.

The present embodiment relates to an embodiment in which the present invention is applied to a full-color copying machine, but an application of the present invention is not limited to this embodiment.

<First Embodiment>

Figure 1:
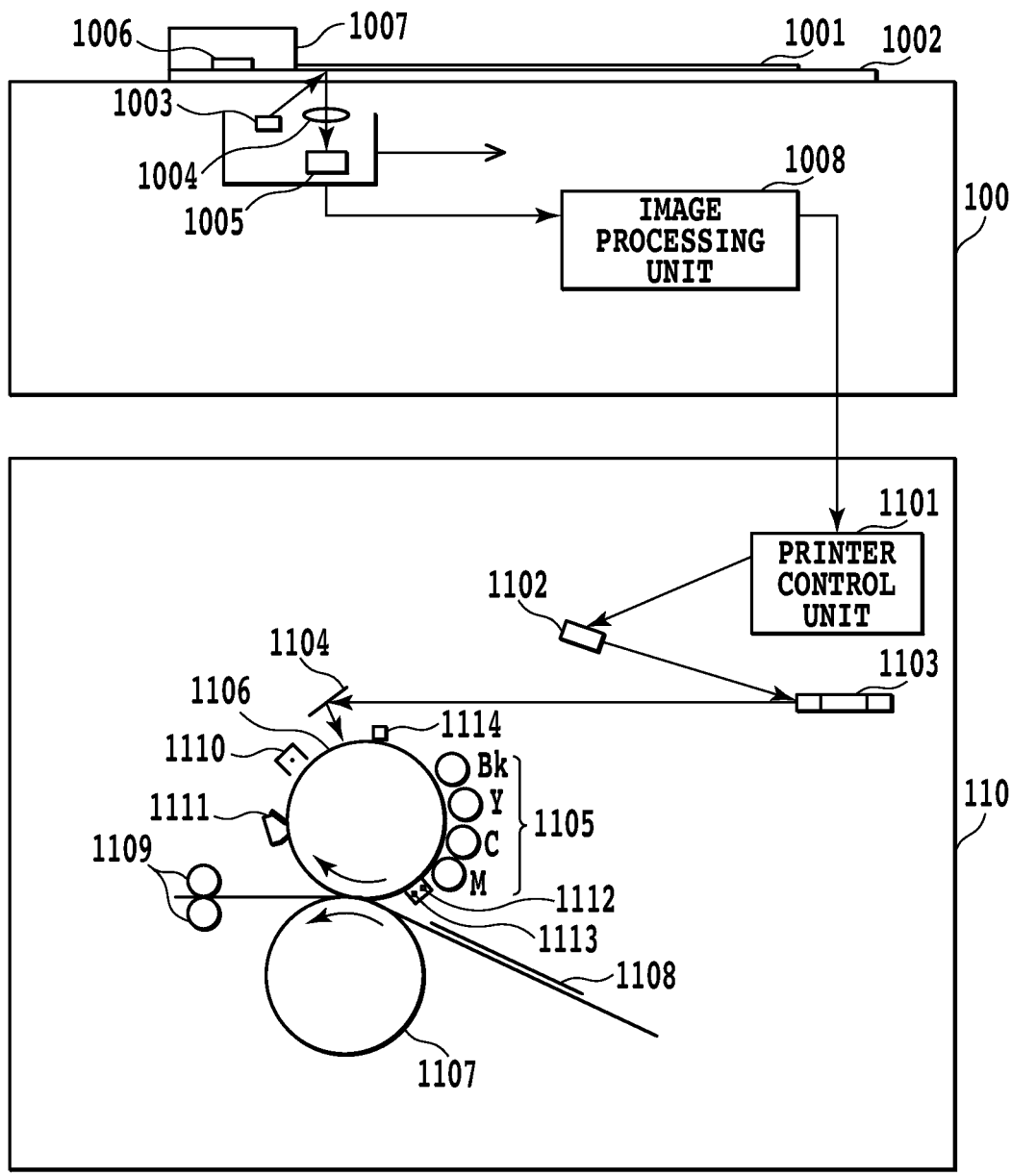
[FIG. 1]

FIG. 1 is a diagram showing an outside appearance of an image processing apparatus according to the present embodiment.

<Reader Unit 100>

An original 1001 put on an original plate glass 1002 of a reader unit 100 is illuminated by a light source 1003, and the reflected light from the original 1001 produces an image in a CCD sensor 1005 through an optical system 1004. The COD sensor 1005 is composed of a group of CCD line sensors of red, green and blue which are arranged in three lines, and color component signals of red, green and blue are produced for each line sensor. The read optical system unit moves in the direction of the arrow shown in FIG. 1 and converts the image of the original 1001 into an electrical signal for each line.

On the original plate glass 1002, there are a positioning member 1007 which abuts against one section of the original 1001 to prevent a slant position of the original 1001 and a reference white plate 1006 which determines a white level of the CCD sensor 1005 to make a shading correction of the CCD sensor 1005.

An image signal obtained by the CCD sensor 1005 is image-processed by an image processing unit 1008, which is sent to a printer unit 110 where the image-processed image signal is processed in a printer control unit 1101.

Figure 2:
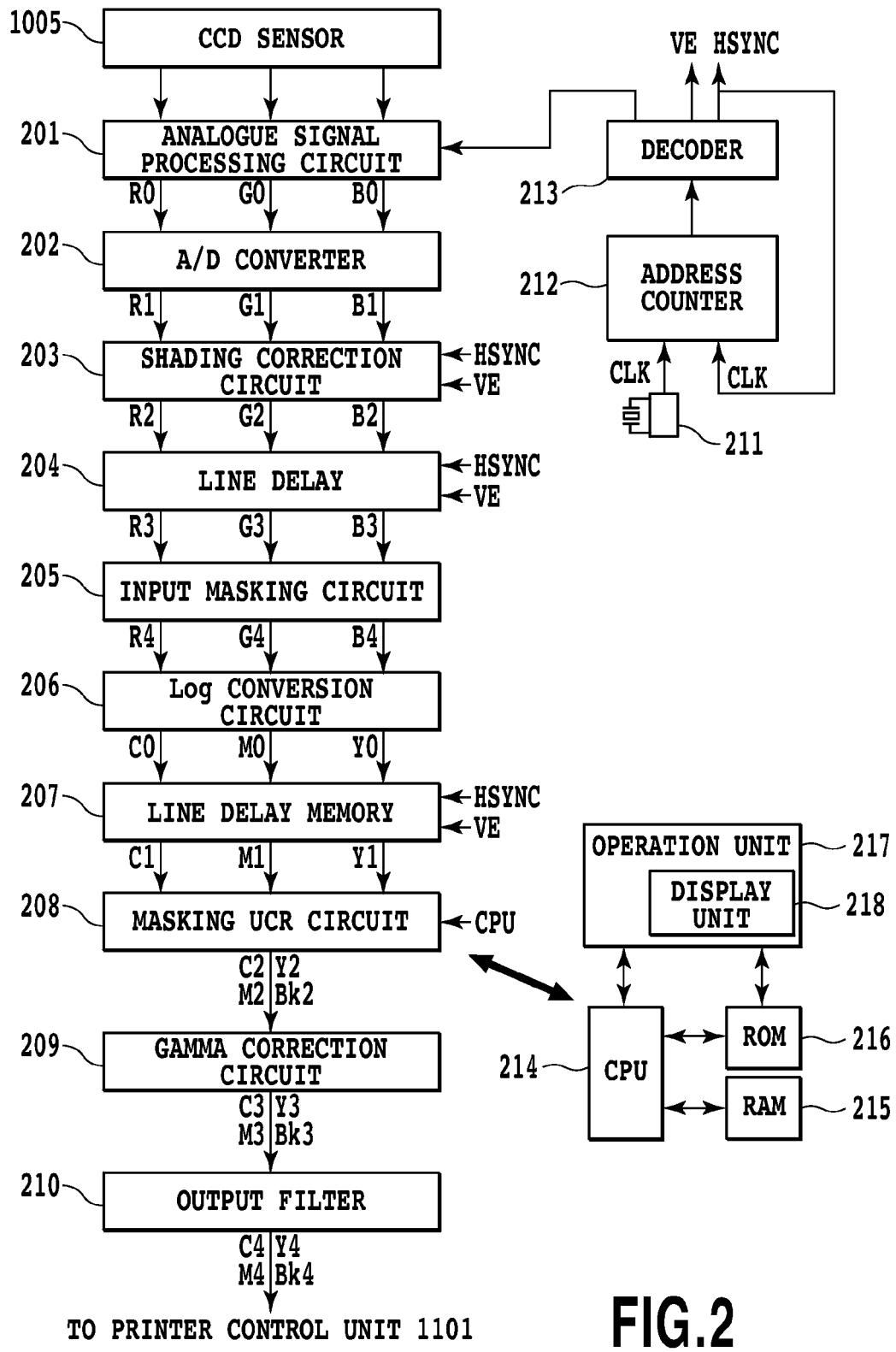
[FIG. 2]

FIG. 2 is a block diagram showing a flow of an image signal in the image processing unit 1008.

As shown in FIG. 2, image signals outputted from the CCD sensor 1005 are inputted to an analog signal processing circuit 201 in which a gain and an offset of the image signal are adjusted. Thereafter, the image signals are converted into digital image signals of R1, G1 and B1 having each color of 8 bits by an A/D converter 202. The image signals of R1, G1 and B1 are inputted to a shading correction circuit 203, to which a well-known shading correction is made using a read signal of the reference white plate 1006 for each color.

A clock generation unit 211 generates clocks (CLK) per one pixel unit. In addition, an address counter 212 counts CLK and generates and outputs a main scan address signal for each line. A decoder 213 decodes the main scan address signal to generate CCD drive signals of shift pulses, reset pulses and the like in a line unit, signals VE expressing an effective region among read signals corresponding to one line outputted by the COD sensor 1005 and line synchronization signals HSYNC. It should be noted that the address counter 12 is cleared by HSYNC and starts with the counting of the main scan address for the next line.

The respective line sensors of the CCD sensor 1005 are located to be spaced by a predetermined distance from each other in the sub scan direction. Therefore, a spatial shift in the sub scan direction is corrected by a line delay 204. Especially by line-delaying a R signal and a G signal to a B signal in the sub scan direction, spatial positions of the ROB signals are matched.

An input masking circuit 205 converts color spaces (read color spaces) of input image signals determined based upon spectral characteristics of ROB filters of the CCD sensor 1005 into predetermined color spaces (for example, reference color spaces of sRGB or NTSC) according to a matrix calculation of the following expression (1).

[Math. 1]

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix} \quad (1)$$

A Log conversion circuit 206 includes a lookup table ROM and converts luminance signals of R4, G4 and R4 into density signals of C0, M0 and Y0. A line delay memory 207 delays image signals of C0, M0 and Y0 by a line delay amount until determining signals such as UCR, FILTER and SEN are generated and outputted from the image signals of R4, G4 and R4, by a black character determining unit (not shown).

A masking UCR circuit 208 extracts a black signal Bk from three-primary color signals of Y1, M1 and C1 inputted thereto. Further, the masking OCR circuit 208 performs a calculation of correcting color turbidity of a print color material of the printer unit 110 and sequentially outputs an image signal of Y2, M2, C2 or Bk2 for each read operation in a predetermined bit width (for example, 8 bits). A gamma correction circuit 209 corrects the image signal in density to adjust to an ideal gradation characteristic of the printer unit 110. In addition, an output filter 210 executes edge emphasis or smoothing processing to the image signal.

The image signals of M4, C4, Y4 and Bk4 obtained by these processes are sent to the printer control unit 1101, wherein the image signal is converted into a pulse signal a pulse width of which is modulated, and density printing by the printer unit 110 is carried out.

In addition, CPU 214 performs control or image processing of the reader unit 100 according to programs stored in ROM 216 using RAM 215 as a work memory. An operator inputs instructions or processing conditions to CPU 214 by an operation unit 217. A display unit 218 displays an operation condition of the image processing apparatus and the set processing condition.

<Printer Unit 110>

In FIG. 1, a surface of the photosensitive drum 1106 rotating in the direction of the arrow is uniformly charged by a primary charger 1110. The printer control unit 1101 outputs a pulse signal in accordance with an image data inputted by a laser driver. A laser light source 1102 outputs laser light in accordance with the pulse signal to be inputted. The laser light is reflected by a polygon mirror 1103 and a mirror 1104 and scans the charged surface of the photosensitive drum 1106. A static latent image is formed on the surface of the photosensitive drum 1106 by the scanning of the laser light.

The static latent image formed on the surface of the photosensitive drum 1106 is developed with toner for each color by a developer 1105. In the present embodiment, one-component toner of a cartridge type with no stirring mechanism is used and developers for the respective colors are located around the photosensitive drum 1106 in the order of black Bk, yellow Y, cyan C and magenta M from the upstream. The developer in accordance with the image forming color comes close to the photosensitive drum 1106 to develop the static latent image.

A print paper 1108 is wound around a transfer drum 1107 having one rotation for each color component, and toner images of the respective colors are transferred and superposed on the print paper 1108 by a sum of four rotations. When the transfer is completed, the print paper 1108 is separated from the transfer drum 1107 and the toner is fixed thereon by a pair of fixing rollers 1109 to complete a print of the image data in full color.

In addition, a surface potential sensor 1114 is located around the photosensitive drum 1106 upstream of the developer 1105 (place where the laser light is provided) for measuring a surface potential of the photosensitive drum 1106. Further, a cleaner 1111 is located around the photosensitive drum 1106 for cleaning the remaining toner, which is not transferred, on the photosensitive drum 1106. In addition, a LED light source 1112 and a photo diode 1113 are located around the photosensitive drum 1106 for detecting a reflection light amount of a toner patch formed on the photosensitive drum 1106.

Figure 3:
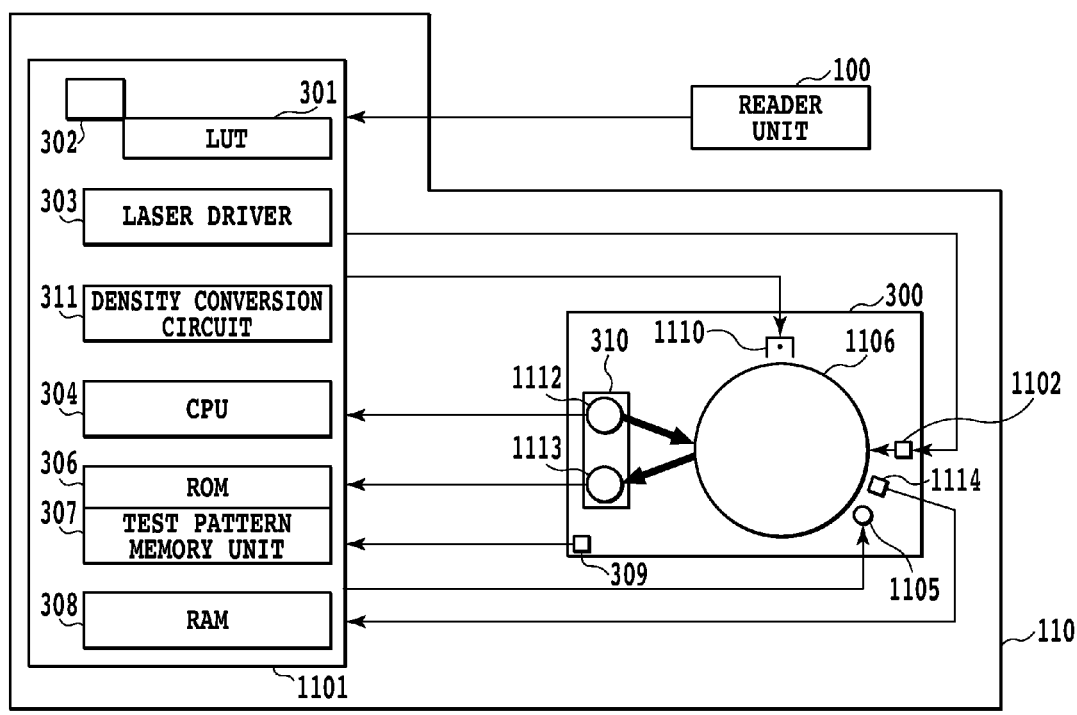
[FIG. 3]

FIG. 3 is a block diagram showing the printer unit 110.

The printer control unit 1101 comprises CPU 304, ROM 306, RAM 308, a test pattern memory unit 307, a density conversion circuit 311, LUT 301, a laser driver 303 and the like, and is capable of communicating with the reader unit 100 and a printer engine 300. CPU 304 controls an operation of the printer unit 110 and also controls a grid potential of the primary charger 1110 and development bias of the developer 1105.

The printer engine 300 comprises the photosensitive drum 1106, a photo sensor 310 composed of the LED light source 1112 and the photo diode 1113, the primary charger 1110, the laser light source 1102, the surface potential sensor 1114, the developer 1105 and the like, which are located around the photosensitive drum 1106. Further, the printer engine 300 comprises an environment sensor 309 for measuring a water component amount (or temperature and relative humidity) in the air in the apparatus.

<Image Processing Unit 1008>

Figure 4:
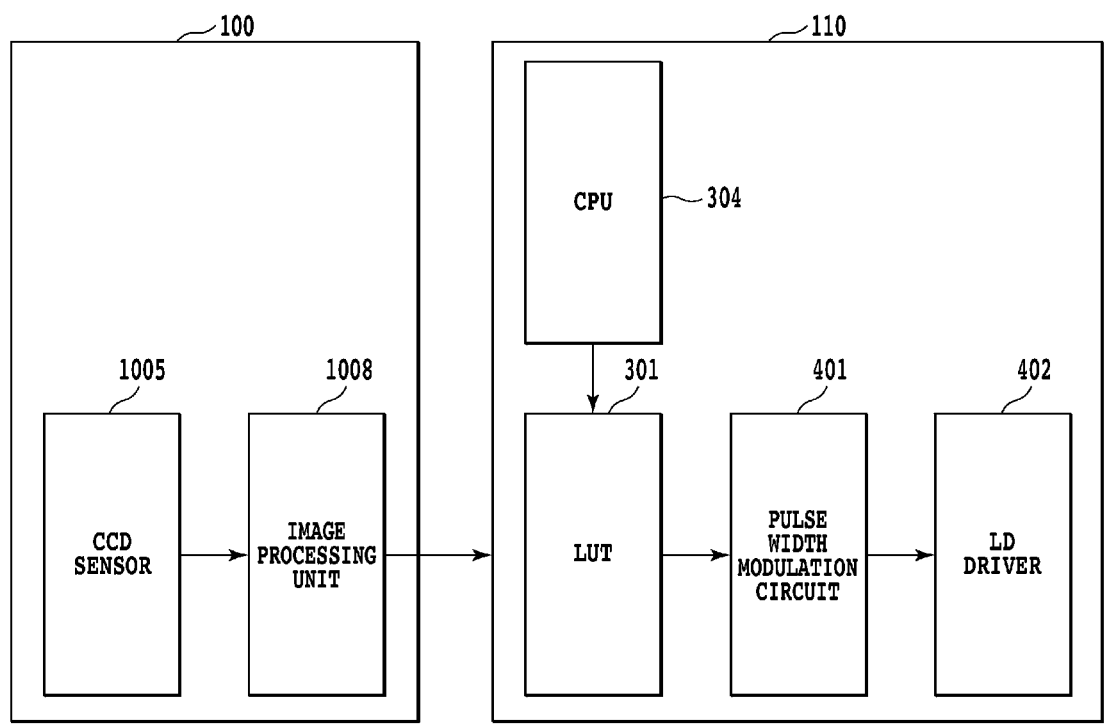
[FIG. 4]

FIG. 4 is a block diagram showing the image processing unit 1008 for obtaining a gradation image.

A luminance signal of an image obtained by the CCD sensor 1005 is converted into a density signal in the image processing unit 1008. The converted density signal has a characteristic which is corrected by LOT (γLUT) 301 to be a signal in accordance with a gamma characteristic of a printer at initial setting, that is, so that density of an original image is equal to density of an output image.

The image signal the gradation characteristic of which is converted by LOT 301 is converted into a pulse signal corresponding to a dot width by a pulse width modulation (PWM) circuit 401 of the laser driver 303, which is sent to a LD driver 402 controlling ON/OFF of the laser light source 1102. It should be noted that in the present embodiment, a gradation reproduction method by pulse width modulation is used for all the colors of Y, B, C and Bk.

Further, a static latent image the gradation of which is controlled with a change of a dot area and having a predetermined gradation characteristic is formed on the photosensitive drum 1106 by the scanning of the laser light outputted from the laser light source 1102, and a gradation image is reproduced through the processes of the aforementioned image development, transfer, and fixation.

<Calibration Control (First Control System) and Detection of Partial Toner-Low State>

Next, there will be explained a first control system in regard to stability of an image reproduction characteristic of a system including both of the reader unit 100 and the printer unit 110 as image control in sequence different from usual image formation (print) forming an image on a print paper. On this occasion, an explanation thereof will be made with detection of a partial toner-low state which is the feature of the present embodiment.

First, there will be explained a control system for calibrating the printer unit 110 using the reader unit 100.

Figure 5:
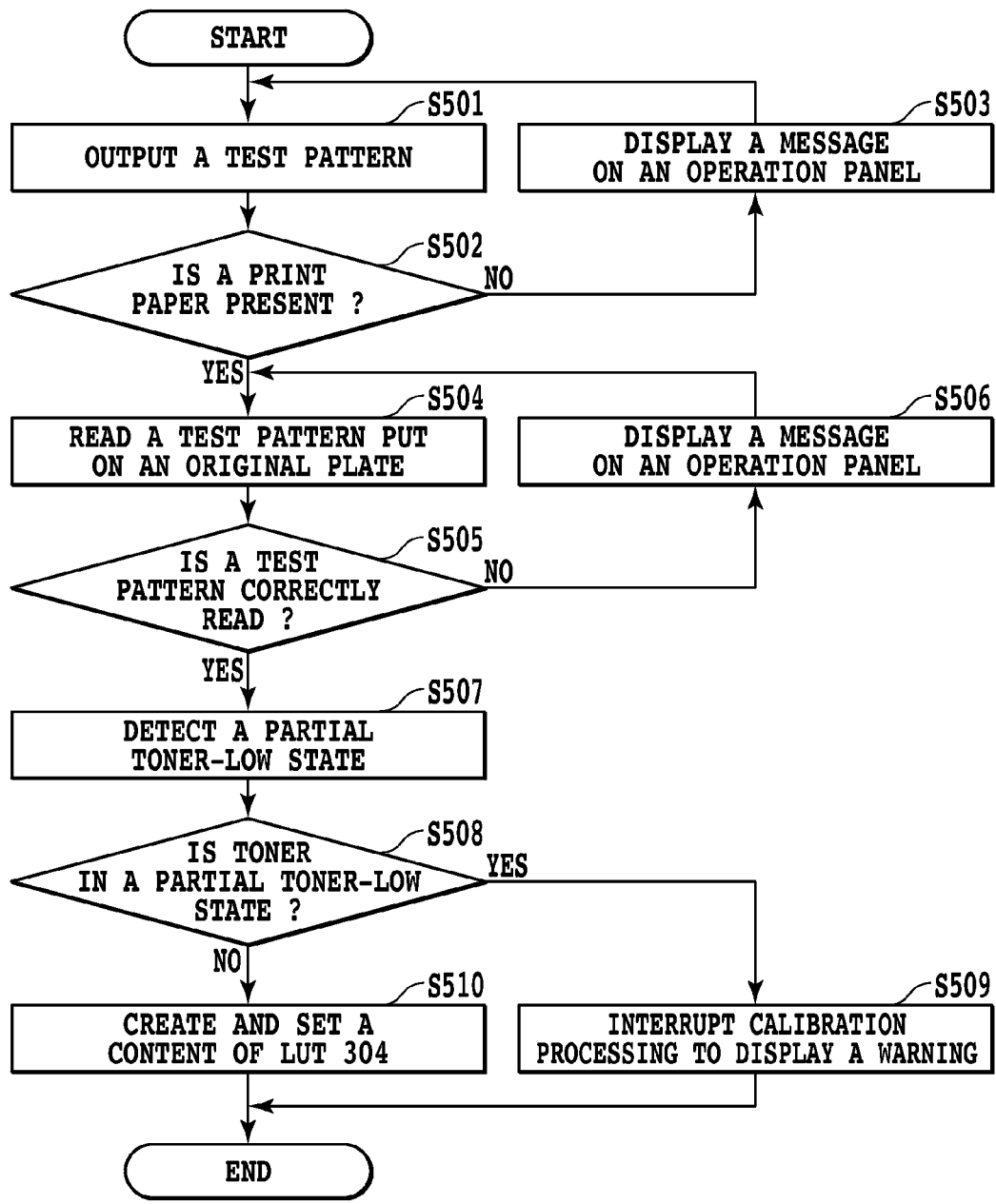
[FIG. 5]

FIG. 5 is a flow chart showing an example of the processing executed in the present embodiment, which is realized in cooperation of CPU 214 for controlling the reader unit 100 and CPU 304 for controlling the printer unit 110.

The operation unit 217 which has received an operation of pushing down a mode setting button, for example, of "automatic gradation correction" provided in the operation unit 217 starts the processing of FIG. 5. It should be noted that the display unit 218 has a liquid crystal operation panel with a touch sensor (touch panel display) as shown in FIG. 6 or FIG. 7.

<Explanation of FIG. 5>

Figure 6:
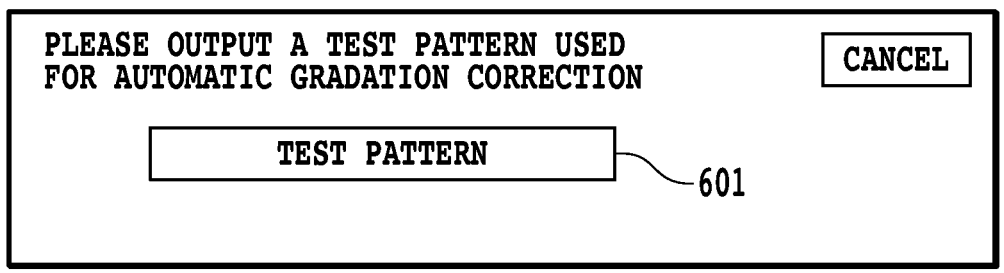
[FIG. 6]
Figure 7:
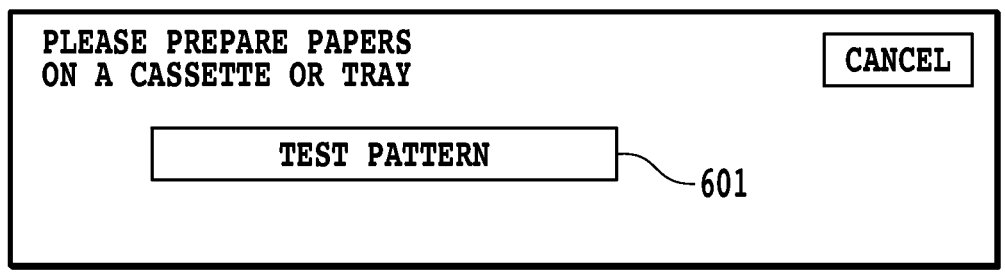
[FIG. 7]

First, an output start button 601 of a test pattern (image data for detecting a partial toner-low state) shown in FIG. 6 appears on the display unit 218. At S501 of FIG. 5, the operation unit 217 outputs a test pattern shown in FIG. 8 from the printer unit 110 by receiving an operation of pushing down the output start button 601 of the test pattern.

Next, at S502, CPU 214 determines presence/absence of a print paper for forming the test pattern. In a case where it is determined at S502 that the print paper is not present, the process goes to S503, wherein CPU 214 displays a warning as shown in FIG. 7 on the display unit 218. The image processing apparatus has a plurality of print paper cassettes, and can select plural kinds of print paper sizes, for example, B4, A3, A4, B5 and the like.

In a case where it is determined at S502 that the print paper is present, the process goes to S504.

Figure 8:
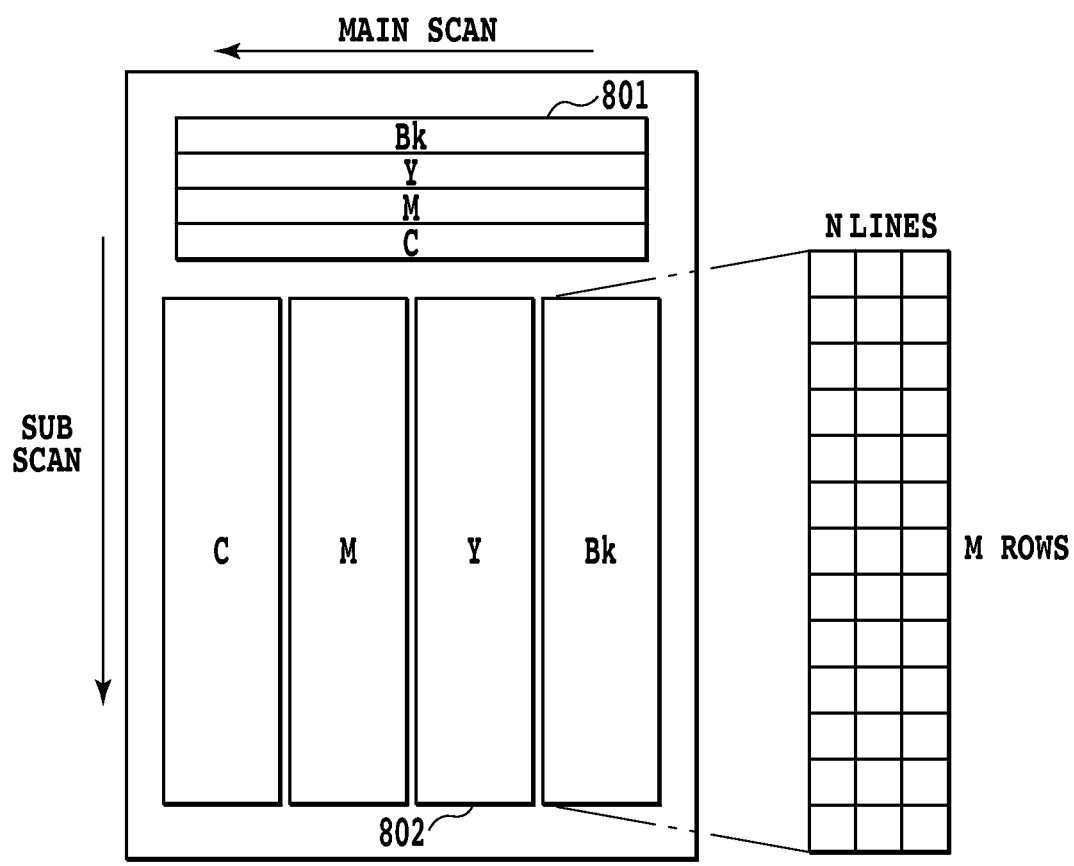
[FIG. 8]

It should be noted that the test pattern shown in FIG. 8 includes a band-shaped pattern 801 and a gradation pattern 802 for each toner kind (here, four colors of X, M, C and Bk). The sizes of these patterns are set to be within a read range of the CCD sensor 1005. In addition, the band-shaped pattern 801 is used for detecting a partial toner-low state, and is set as a uniform pattern for basically outputting, not an intermediate density region where the density is unstable, but a high-density region. This band-shaped pattern is printed at least on an area covering an effective print region in the main scan direction in image formation. The high density region is preferably the maximum density which can be reproduced in the print unit, but in a case where reduction of the toner is preferable, the density corresponding to the order of 70% of the toner reproducing the maximum density is preferable. The density is, of course, not limited to 70% as long as it is at least 50%.

Figure 9:
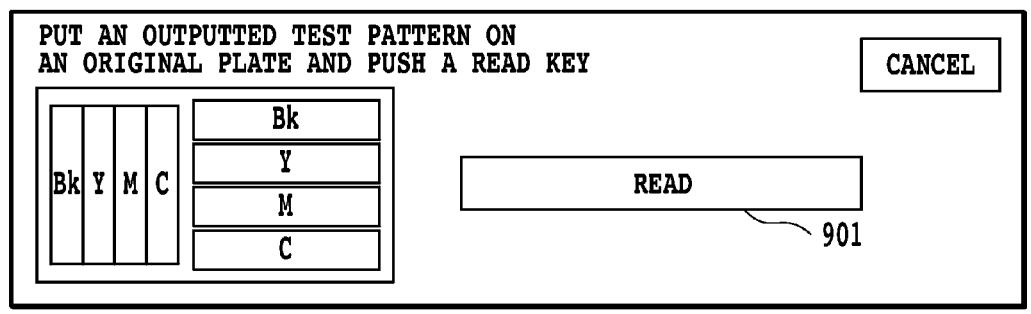
[FIG. 9]

At S504, a read button 901 shown in FIG. 9 appears on the display unit 218. The operation unit 217 reads data from the test pattern put on the original plate by receiving an operation of pushing down the read button 901.

Figure 10:
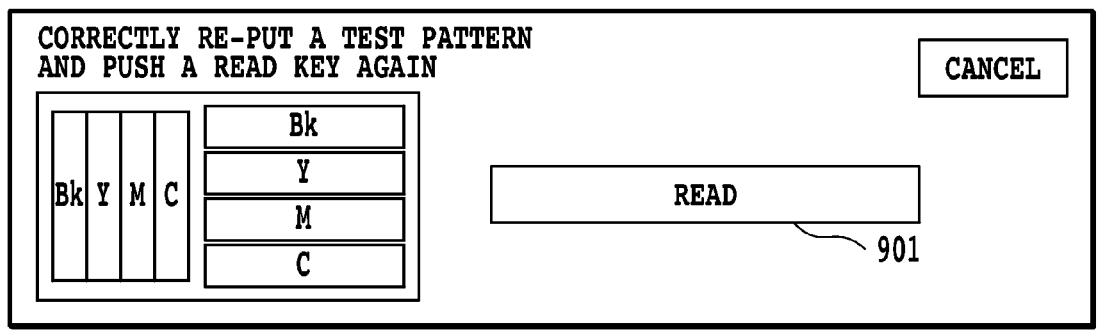
[FIG. 10]

At S505, CPU 214 determines whether or not the reading of the test pattern is correctly made, based upon the data read at S504. In a case where at S505, CPU 214 determines that the correct reading is not made, for example, the inclination is large, the process goes to S506, wherein a warning as shown in FIG. 10 is displayed on the display unit 218.

In a case where at S505, CPU 219 determines that the correct reading is made, the process goes to S507.

At S507, CPU 214 detects whether or not a partial toner-low state occurs in each toner by using the read result of each band-shaped pattern 801. A detailed detection method will be explained with reference to FIG. 12.

In a case where at S508 it is determined based upon the detection result of S507 that the partial toner-low state occurs, the process goes to S509, wherein CPU 214 interrupts the calibration processing and displays a warning as shown in FIG. 11 on the display unit 218. It should be noted here that the partial toner-low state in the main scan direction can be prevented without replacing a cartridge of Bk toner by a user removing, shaking, and reloading a cartridge. To that end, the display of warning messages may include information prompting the user to remove, shake, and reload a cartridge. Here, FIG. 11 is shown on the basis of the determination that the partial toner-low state occurs in Bk toner. In addition, in a case where it is determined at S508 that the partial toner-low state does not occur, the process goes to S510, wherein CPU 214 executes usual calibration processing. Further, CPU 214 creates (calibrates) and sets a content of LUT 301 provided for each color of CMYK so as to make a correction in such a manner that the obtained density information comes close to a predetermined target density (target reproduction characteristic).

It should be noted that since production of the calibration LUT can be made by using the conventional technology, a detail explanation of the production of the calibration LUT is here omitted.

Figure 12:
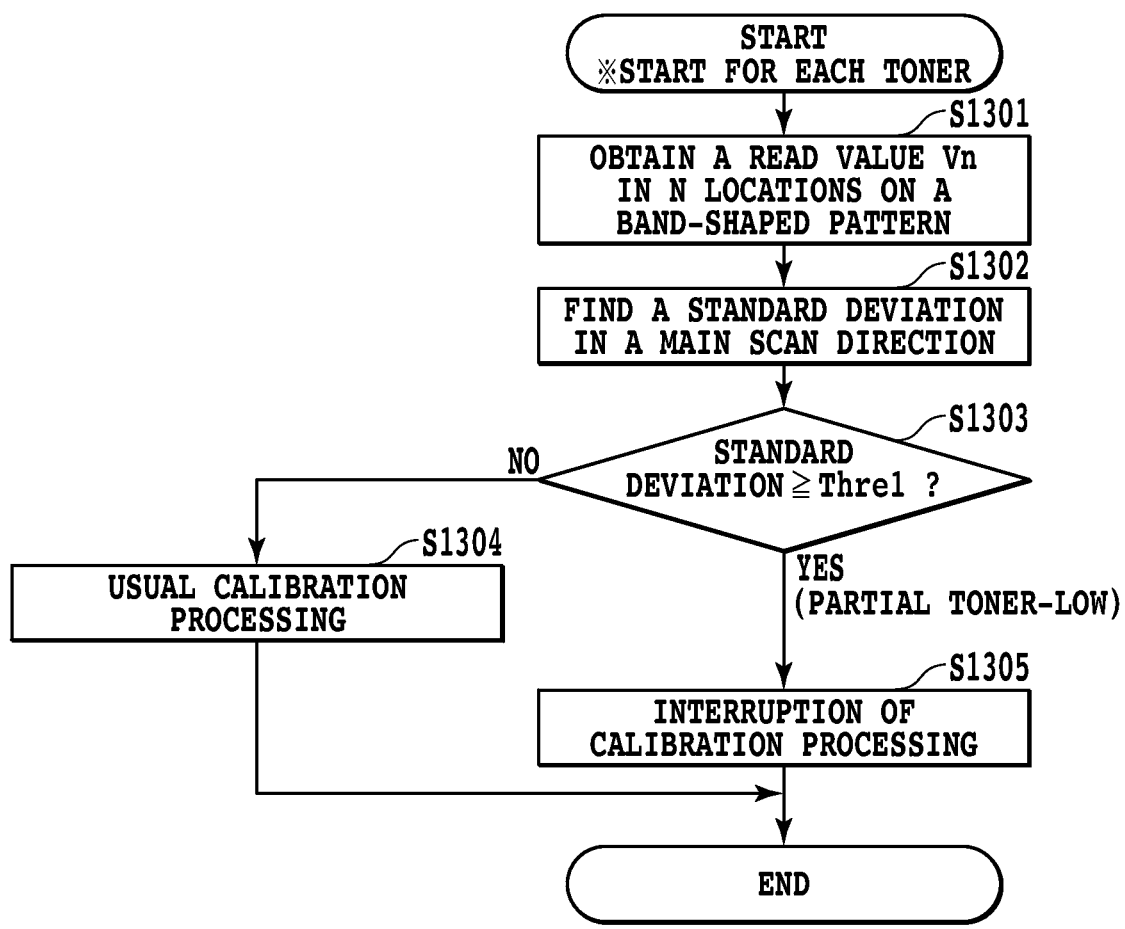
[FIG. 12]

<Explanation of FIG. 12>

Here, a detailed explanation of the processing for detecting the partial toner-low state of S507 in FIG. 5 will be explained with reference to a flow chart shown in FIG. 12. It should be noted that the processing of the flowchart in FIG. 12 is executed for each toner kind (CMYK).

First, at S1301, CPU 214 obtains a read value $V_n$ in N locations (N>1) on the band-shaped pattern 801 in FIG. 8. At S1302, CPU 214 finds a standard deviation S of the read value in the main scan direction from the N pieces of $V_n$ obtained at S1301 as below. Here, the N pieces exist at positions which are uniformly distributed over the whole band-shaped pattern. Of course, the N pieces may not exist at positions which are uniformly distributed over the whole band-shaped pattern in a rigorous manner and the N pieces may exist at positions which are distributed over the whole band-shaped pattern in the main scan direction.

First, CPU 214 finds an average value avg (V) of $V_n$ according to the following expression (2).

[Math. 2]
$$avg(V) = \sum_{n=0}^{N-1} \frac{V_n}{N} \quad (2)$$

Next, CPU 214 finds dispersion $\sigma^2$ according to the following expression (3).

[Math. 3]
$$\sigma^2 = \frac{\sum_{n=0}^{N-1} (V_n - \arg(V))^2}{N} \quad (3)$$

Next, CPU 214 finds a standard deviation S according to the following expression (4).

[Math. 4]
$$S = \sqrt{\sigma^2} \quad (4)$$

At S1303, CPU 214 determines whether or not the standard deviation (S)≧Thre1. Here, Thre1 is a predetermined value. In a case where it is determined at S1303 that the standard deviation (S)≧Thre1, the process goes to S1305. In this case, the read values of the band-shaped pattern which should be originally uniform have large variations. That is, the partial toner-low state possibly occurs somewhere in the toner. At S1305, CPU 214 interrupts the calibration processing. It should be noted that at S1305, the calibration processing only to the toner in which the read values of the band-shaped pattern have large variations may be interrupted.

In a case where it is determined at S1303 that the standard deviation (S)<Thre1, the process goes to S1304. In this case, since the read values of the band-shaped pattern have small variations, the partial toner-low state does not occur in the toner. At S1304, CPU 214 executes usual calibration processing.

In the above embodiment, there is explained an example of calibration where the gradation test pattern of a single color of C, M, Y or Bk is formed to correct a gradation density characteristic in regard to each single color to a target reproduction characteristic. However, not the gradation test pattern of the single color, but a test pattern in which C, M, and Bk are mixed may be formed, which is applied to calibration for adjusting a color reproduction characteristic of the mixed color. It should be noted that in this case, the masking UCR circuit is changed to 3D (multi-dimension) LUT for performing direct mapping, and values corresponding to grid points of 3D (multi-dimension) LUT are targets adjusted by calibration.

<Second Embodiment>

In the explanation of the following second embodiment, only points thereof different from the first embodiment will be explained.

Here, as to a point thereof different from the first embodiment, even in a case where the partial toner-low state occurs, if the occurrence position is away from the gradation pattern 802, usual calibration processing continues to be executed as it is.

The explanation will be made with reference to a flowchart shown in FIG. 13. It should be noted that in the processing of the flow chart in FIG. 13, the processing is executed for each toner kind.

Figure 13:
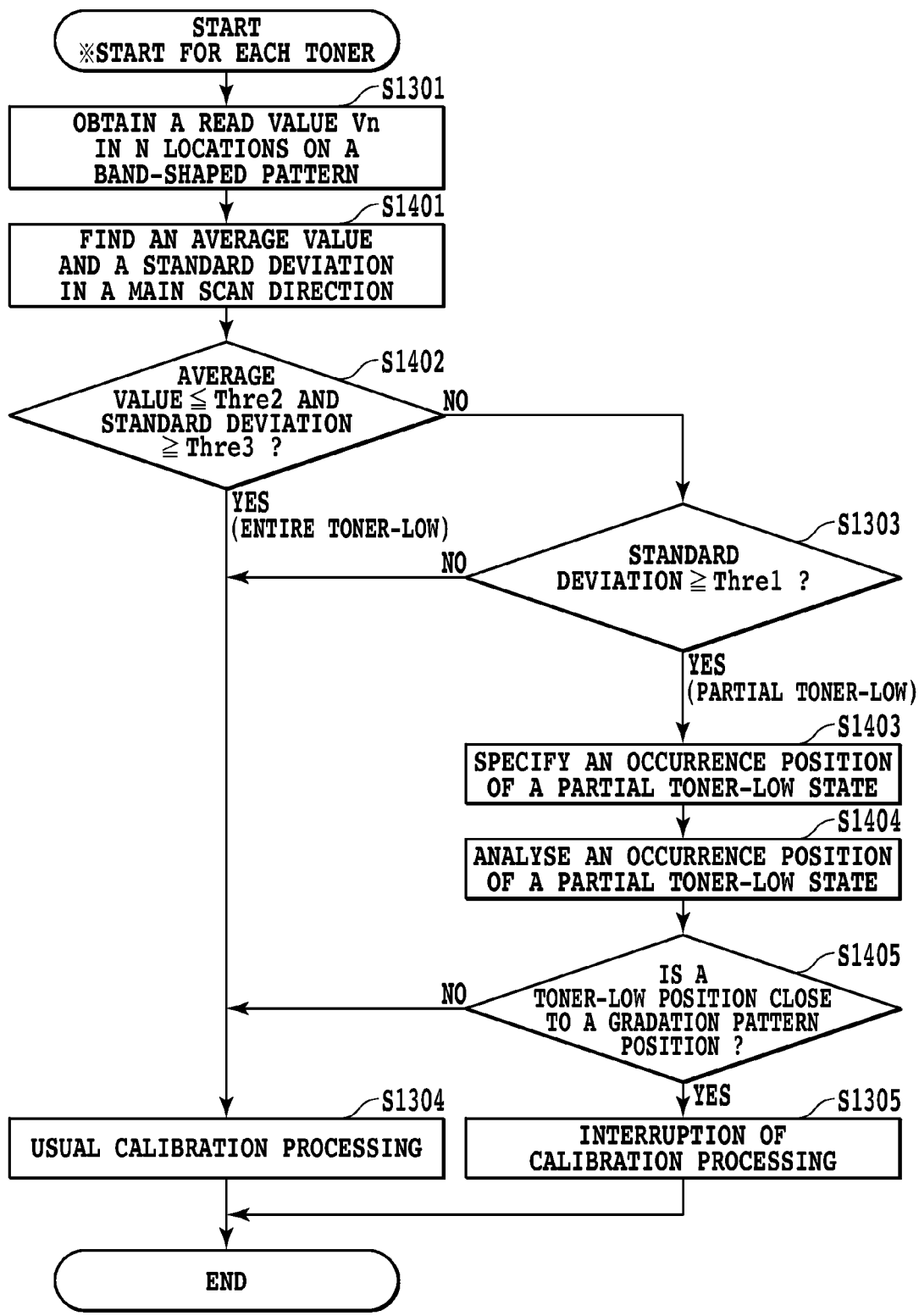
[FIG. 13]

<Explanation of FIG. 13>

At S1400, CPU 214 obtains a read value $V_n$ in N locations (N>1) on the band-shaped pattern 801 in FIG. 8.

Next, at S1401, CPU 214 finds an average value avg (V) of the read value in the main scan direction from N pieces of obtained at S1401 and the standard deviation S according to the expressions (2) and (3).

At S1402, CPU 214 determines whether or not the average value≦Thre2 and the standard deviation≦Thre3. In a case where it is determined at S1402 that the average value≦Thre2 and the standard deviation≦Thre3, the process goes to S1304.

In this case, since the average value≦Thre2 (average value is relatively lower than expected) and the standard deviation≦Thre3 (density variation in the main scan direction is small), the toner is in an entire toner-low state.

On the other hand, in a case where CPU 214 determines at S1402 that it is not established that the average value≦Thre2 and the standard deviation≦Thre3, the process goes to S1303

It should be noted that the determination that the toner is in the entire toner-low state may be made by sensor information of a toner remaining amount detecting sensor (not shown) having a cartridge of the toner.

In addition, at S1304 CPU 214 executes usual calibration processing. Here, since the toner is in the entire toner-low state, CPU 214 may interrupt the calibration processing.

At S1303, CPU 214 determines whether or not the standard deviation (S)≧Thre1. In a case where it is determined at S1303 that the standard deviation (S)≧Thre1, the process goes to S1403. In this case, the density variation in the main scan direction is large and the partial toner-low state possibly occurs in the toner. In a case where it is determined at S1303 that the standard deviation (S)<Thre1, the process goes to S1304.

At S1403, CPU 214 specifies an occurrence position of the partial toner-low state. For example, CPU 214 may compare the average value avg (V) with $V_n$ and specify a location where the variation close to the standard deviation occurs, as the occurrence position of the partial toner-low state.

At S1404, CPU 214 analyses the occurrence position of the partial toner-low state specified at S1403. Especially the occurrence position of the partial toner-low state specified at S1403 is compared with a position where the gradation pattern 802 is formed. In addition, CPU 214 analyses whether or not the occurrence position of the partial toner-low state specified at S1403 is close to the gradation pattern 802 in the main scan direction.

Next, at S1405 CPU 214 determines whether or not the position of the partial toner-low state is close to the position where the gradation pattern 802 is formed, based upon the analysis performed at S1404. In a case where at S1405 it is determined that the position of the partial toner-low state is close to the position where the gradation pattern 802 is formed, the process goes to S1305. At S1305, CPU 214 interrupts the calibration processing. On the other hand, in a case where at S1405 it is determined that the position of the partial toner-low state is not close to the position where the gradation pattern 802 is formed, the process goes to S1304. At S1304, CPU 214 executes usual calibration processing.

When determined that the position of partial toner-low state is the left end of the Bk band-shaped pattern 801, for example, it may be determined that partial toner-low is not occurred in a main scan position where Bk gradation pattern 802 is formed. In this case, the formed Bk gradation pattern adequately shows the reproduction characteristic of the Bk printer unit 110, and thus usual calibration processing can be executed.

On the other hand, when determined, for example, that the position of partial toner-low state is the right end of the Bk band-shaped pattern 801, it may be determined that the partial toner-low is occurred in a main scan position where Bk gradation pattern 802 is formed. If, at the same time, determined that partial toner-low is not occurred at the left end of the band-shaped pattern 801 for Bk and that partial toner-low of C is not occurred at least in the band-shaped pattern 801 for C, then the test pattern which replaced the forming position on the test pattern of the gradation pattern 802 for Bk and the forming position on the test pattern of the gradation pattern 802 for C is preferably printed by the printer unit. As a result, formation of a test pattern can be performed that forms a gradation pattern at a position where toner-low is not occurred for both Bk and C and therefore allows formation of a reliable gradation pattern.

As described above, when a position of partial Loner-low in a band-shaped pattern of a certain color is superposed on a position of the gradation pattern of the color in the main scan direction and when partial toner-low is not occurred in a band-shaped pattern of another color, the test pattern is reformed by replacing the position of the gradation pattern of the certain color and the forming position of the band-shaped pattern of the another color, thereby allowing continuous execution of calibration.

<Third Embodiment>

In the explanation of the following third embodiment, only points thereof different from the first embodiment and the second embodiment will be explained.

<Calibration Control (Second Control System) and Detection of Partial Toner-Low State>

There will be explained a second control system in regard to stability of an image reproduction characteristic of the printer unit 110 alone, which is image control performed in the middle of usual image formation.

The second control system forms a patch of each of colors of Y, M, C and Bk on the photosensitive drum 1106, and reads reflection light of the patch using the LED light source 1112 and the photo diode 1113, which will be converted into density information. In addition, LUT 301 (γLUT) is corrected by using the density information of the patch to stabilize the image reproduction characteristic.

It should be noted that in the embodiment, the photosensitive drum having a relative large bore diameter is used. Further, for accurately and efficiently obtaining the density information, patches of the same color are formed at positions in point symmetry to the center of the photosensitive drum 1106 in consideration of eccentricity of the photosensitive drum 1106, and the density information is found by averaging a plurality of values obtained by measuring these patches.

In addition, the second control system is provided with control which forms a patch in a non-image region in the middle of the usual image formation and detects the density to correct table data of LOT 301 as needed. Since a region on the photosensitive drum 1106 corresponding to a gap portion between print papers wound around the transfer drum 1107 corresponds to the non-image region, the patch is formed in that region.

Next, detection of the partial toner-low state which is the feature of the present embodiment in the second control system will be explained.

In the second control system, patches of the same color are, as described above, formed in positions in point symmetry to the center of the photosensitive drum 1106. When the density values are compared from the read values of these patches and are largely different from each other (the density values are different from each other by over predetermined threshold value T), it is determined that the partial toner-low state occurs. It should be noted that the patch to be compared is a patch outputting, not an intermediate density region which is basically unstable, but a high density region.

<Fourth Embodiment>

In the explanation of the following fourth embodiment, only points thereof different from the third embodiment will be explained.

In a case where in the third embodiment, the main scan positions between patches to be compared are very away from each other, there is the possibility that both of the patches are in the partial toner-low state. In this case, since the density difference does not occur largely, it results in being incapable of detecting the partial toner-low state.

Therefore, at least one patch is outputted in a position where the toner remaining amount detecting sensor with a cartridge (not shown) can cover the remaining amount detection with some degrees of accuracy. This patch is defined as a reference patch. The toner-low state in the reference patch position is detected by the toner remaining amount detecting sensor, and the partial toner-low state in the other patch position can be determined based upon a density difference from the reference patch.

<Fifth Embodiment>

The test pattern is shown in FIG. 8 with the band-shaped pattern 801, but since it is only required to obtain the read value $V_n$ in N locations (N>1) in the main scan direction, the test pattern is not necessarily band-shaped. Description is made in such a manner that the band-shaped pattern 801 and the gradation pattern 802 exist on the same paper, but the embodiment is not limited thereto. For example, the band-shaped pattern and the gradation pattern may exist on the paper where images are continuously formed.

Further, in use of a plurality of toner remaining amount detecting sensors, the calibration may be controlled by detecting the partial toner-low state from information of the plurality of the sensors.

<Other Embodiments>

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-095987, filed Apr. 10, 2009, which is hereby incorporated by reference herein in its entirety.

The invention claimed is:

1. An image processing apparatus using a toner cartridge not having a stirring mechanism, comprising:
   a detecting unit for detecting a toner remaining amount in a first position;
   an output unit for outputting N pieces (N>1) of a uniform pattern of density onto the first position and a second position other than the first position on an area covering an effective print region in a main scan direction of image formation for detecting a partial toner-low state;
   an acquiring unit for acquiring read values from N positions on the pattern;
   a determining unit for determining whether a partial toner-low state occurs in the first position by using a detection result by the detecting unit and determining whether a partial toner-low state occurs in the second position by using a density difference between a read value of the pattern outputted on the first position and a read value of the pattern outputted on the second position; and
   a control unit for controlling execution of calibration adjusting a reproduction characteristic in outputting an image using the toner, if the determining unit determines a partial toner-low state occurs in the first position or the second position.

2. An image processing apparatus according to claim 1, wherein the pattern output by the output unit includes data for performing output of a high density region.

3. An image processing method of an image processing apparatus using a toner cartridge not having a stirring mechanism, comprising:
   a detection step for detecting a toner remaining amount in a first position;
   an output step for outputting N pieces (N>1) of a uniform pattern of density onto the first position and a second position other than the first position on an area covering an effective print region in a main scan direction of image formation for detecting a partial toner-low state;
   an acquiring step for acquiring read values from N positions on the pattern;
   a determining step for determining whether a partial toner-low state occurs in the first position by using a detection result by the detection step and determining whether a partial toner-low state occurs in the second position by using a density difference between a read value of the pattern outputted on the first position and a read value of the pattern outputted on the second position; and
   a control step for controlling execution of calibration adjusting a reproduction characteristic in outputting the image using the toner, if in the determining step it is determined that a partial toner-low state occurs in the first position or the second position.

4. A non-transitory, computer-readable medium storing a program for executing the image processing method according to claim 3 by a computer.

* * * * *